(12) United States Patent
Oh et al.

(10) Patent No.: US 7,283,331 B2
(45) Date of Patent: Oct. 16, 2007

(54) METHOD AND APPARATUS REDUCING OFF TRACK HEAD MOTION DUE TO DISK VIBRATION IN A HARD DISK DRIVE

(75) Inventors: Dong-Ho Oh, San Jose, CA (US); Seong-Woo Kang, San Jose, CA (US); Haeng-Soo Lee, Yongin (KR); Frank Ivan Morris, San Jose, CA (US); Momo K. Boljanovic, Milpitas, CA (US); Young-Hoon Kim, Santa Clara, CA (US)

(73) Assignee: Samsung Electronics, Co., Ltd., Suwon (KR)

( * ) Notice: Subject to any disclaimer, the term of this patent is extended or adjusted under 35 U.S.C. 154(b) by 440 days.

(21) Appl. No.: 10/861,597

(22) Filed: Jun. 4, 2004

(65) Prior Publication Data

US 2005/0270698 A1 Dec. 8, 2005

(51) Int. Cl.
*G11B 5/48* (2006.01)
(52) U.S. Cl. .................................. 360/245.1
(58) Field of Classification Search ............. 360/245.1, 360/236.3, 245, 246.1, 246.2, 245.3, 245.6, 360/246.3, 246.4, 246
See application file for complete search history.

(56) References Cited

U.S. PATENT DOCUMENTS

| | | | | |
|---|---|---|---|---|
| 4,972,281 A | * | 11/1990 | Fujioka | 360/246.8 |
| 5,299,080 A | * | 3/1994 | Mizuno et al. | 369/13.17 |
| 5,557,488 A | * | 9/1996 | Hamilton et al. | 360/245.9 |
| 5,652,684 A | * | 7/1997 | Harrison et al. | 360/245.1 |
| 6,028,743 A | * | 2/2000 | Kakuno | 360/246.3 |
| 6,078,470 A | * | 6/2000 | Danielson et al. | 360/245.1 |
| 6,400,532 B1 | * | 6/2002 | Mei | 360/245.1 |
| 6,421,207 B1 | * | 7/2002 | Sato | 360/246.4 |
| 6,430,006 B2 | * | 8/2002 | Kameyama | 360/245.1 |
| 6,781,794 B2 | * | 8/2004 | Ohwe et al. | 360/245.1 |
| 6,785,095 B2 | * | 8/2004 | Tokisue et al. | 360/245.1 |
| 6,898,841 B2 | * | 5/2005 | Shiraishi | 29/603.04 |
| 6,965,500 B1 | * | 11/2005 | Hanna et al. | 360/245 |
| 2003/0193751 A1 | * | 10/2003 | Ohwe et al. | 360/245.1 |

\* cited by examiner

*Primary Examiner*—Allen Cao
(74) *Attorney, Agent, or Firm*—Earle Jennings; GSS Law Group

(57) ABSTRACT

The invention includes sliders provided with indented surfaces, reducing the roll center for head gimbal assemblies below the effective thickness of the slider. Head gimbal assemblies built with these sliders may reduce off-track displacements induced by disk vibration. The load beam gimbal may contact the indented surface, creating a slider roll center less than the slider thickness. Alternatively, the sliders may include a slider contact cover interfacing to the load beam forming the gimbal. The slider contact covers may couple with the slider through an indented surface located closer than the slider thickness. These may have a negative slider roll center. The invention includes actuator arms, actuator assemblies, and hard disk drives including these head gimbal assemblies. The invention includes making the invention's sliders, head gimbal assemblies, actuator arms, actuator assemblies, and hard disk drives. The invention includes the products of these processes.

24 Claims, 11 Drawing Sheets

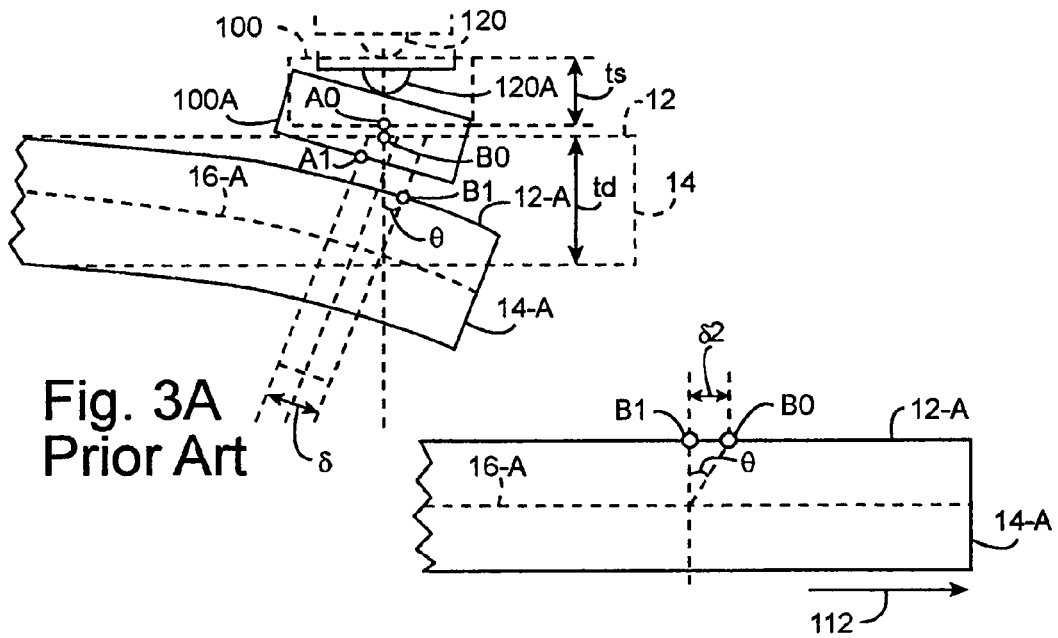
Fig. 3A Prior Art
Fig. 3B Prior Art
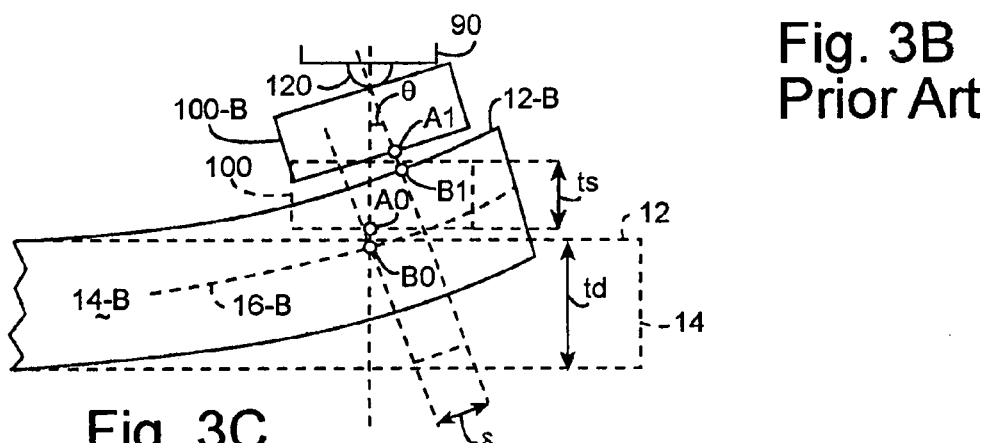
Fig. 3C Prior Art
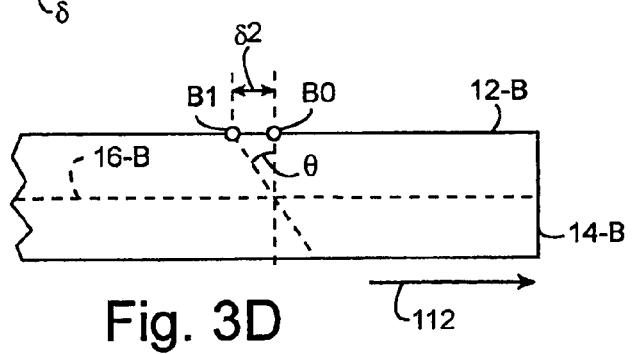
Fig. 3D Prior Art

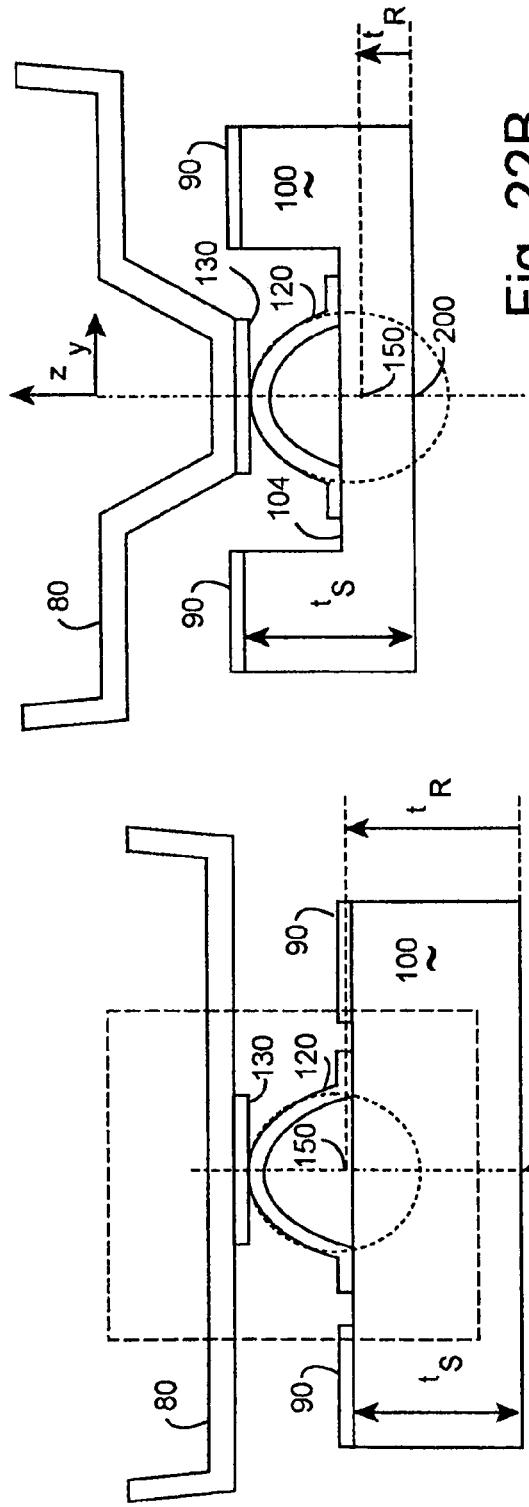
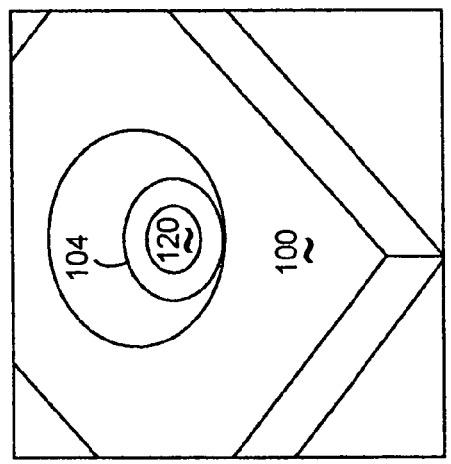
Fig. 22A
Fig. 22B
Fig. 22C

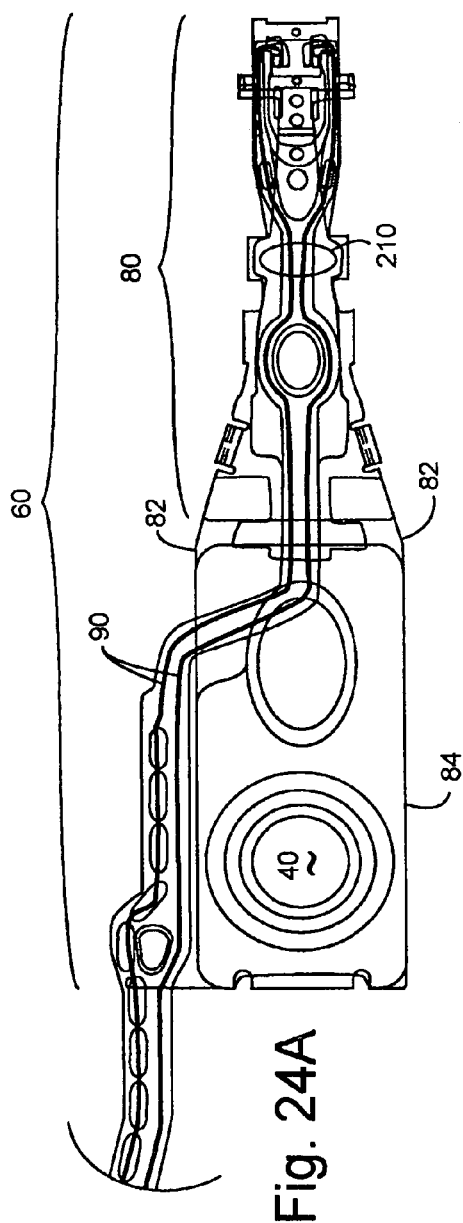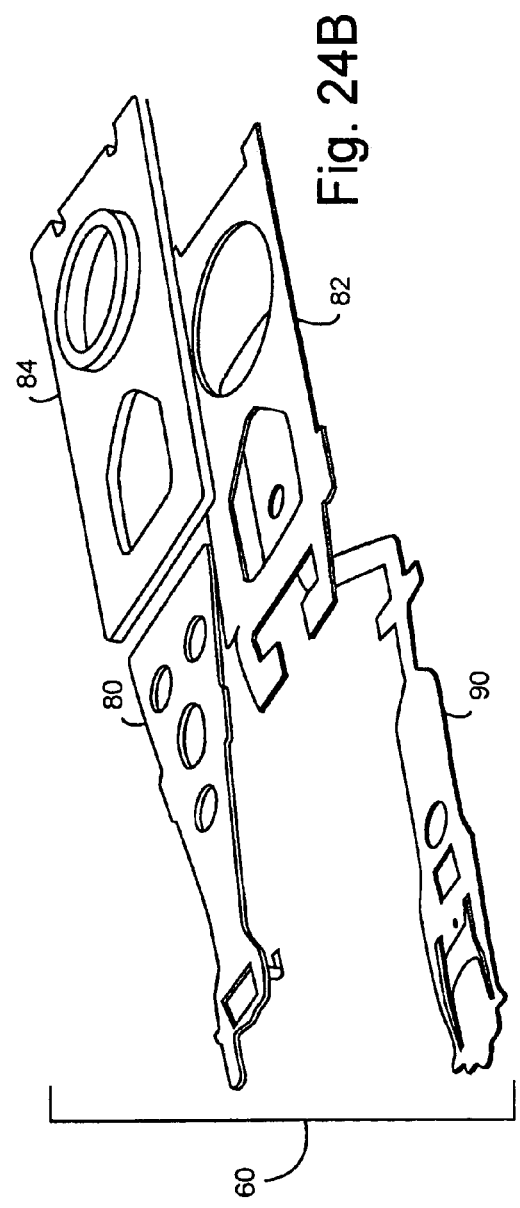

METHOD AND APPARATUS REDUCING OFF TRACK HEAD MOTION DUE TO DISK VIBRATION IN A HARD DISK DRIVE

BACKGROUND OF THE INVENTION

1. Field of the Invention

The present invention relates to the sliders and the head gimbal assemblies of a hard disk drive.

2. Background Information

Hard disk drives contain one or more magnetic heads that are coupled to rotating disks. The heads write and read information by magnetizing and sensing the magnetic fields of the disk surfaces. Magnetic heads have been developed that have a write element for magnetizing the disks and a separate read element for sensing the magnetic field of the disks. The read element is typically constructed from a magneto-resistive material with a resistance that varies with the magnetic fields of the disk. Heads with magneto-resistive read elements are commonly referred to as magneto-resistive (MR) heads.

Each head is embedded in a slider, which is attached to a flexure arm to create a subassembly commonly referred to as a head gimbal assembly (HGA). The HGA's are attached to an actuator arm. The actuator arm has a voice coil motor that can move the heads across the surfaces of the disks.

Information is stored in radial tracks that extend across the surfaces of each disk. Each track is typically divided up into a number of segments or sectors. The voice coil motor and actuator arm can move the heads to different tracks of the disks and to different sectors of each track.

A suspension interconnect extends along the length of the flexure arm and connects the head to a preamplifier. The suspension interconnect typically comprises a pair of conductive write traces and a pair of conductive read traces. One pair of traces, such as the read traces, extend down one side of the flexure arm to the head and the remaining pair of traces extends down the other side of the flexure arm to the head.

The number of Tracks Per Inch (TPI) formed on the surface of hard disk drives is rapidly increasing, leading to smaller and smaller track positional tolerances. The track position tolerance, or the offset of the read-write head from a track, is monitored by a signal known as the head Positional Error Signal (PES). Reading a track successfully usually requires minimizing read-write head PES occurrences. The allowable level of PES is becoming smaller and smaller. A substantial portion of the PES is caused by disk vibration.

Track Mis-Registration (TMR) occurs when a read-write head loses the track registration. This occurs when the disk surface bends up or down. TMR is often a statistical measure of the positional error between a read-write head and the center of an accessed track.

One approach to reducing TMR uses the head gimbal assemblies to provide a radial motion capability, which lowers the Track Mis-Registration (TMR) due to disk vibration. The head gimbal assembly, including a biased load beam, creates a roll center (also known as a dimple center), which provides a radial motion capability as the load beam moves vertically due to disk vibration. This allows sliders to move in a radial direction as well as in a vertical direction with respect to the disks, reducing off-track motion due to disk vibration.

This approach has some problems. An air bearing forms between the slider face and the disk surface. The slider face is tilted near the disk surface when it is flat. The air bearing becomes non-uniform when the disk surface is flat, adding new mechanical instabilities into the system.

An alternative prior art head gimbal assembly provides a slider mounted so that it pivots in the radially oriented plane about the effective roll axis, which is located within the disk. This scheme does not cause a non-uniform air bearing when the disk surface is flat. However, the way the effective roll axis is placed inside the disk requires a more complex mechanical coupling between the slider support assembly and the slider. This complex mechanical coupling has a greater probability of mechanical failure, tending to increase manufacturing expenses and to reduce hard disk drive life expectancy.

Accordingly, there exists a need for head gimbal assembly mechanisms that may provide a stable air bearing, and which may follow a track when a disk surface bends. These head gimbal assembly mechanisms also need to be inexpensive to manufacture.

BRIEF SUMMARY OF THE INVENTION

The invention includes sliders provided with indented back-side surfaces, which reduce the slider roll center to less than the slider's effective thickness. The back-side surface is opposite the front side of the slider with the read-write head, which faces the rotating disk surface in a hard disk drive. Head gimbal assemblies built with these sliders may reduce off-track displacements induced by disk vibration.

The invention includes head gimbal assemblies with a load beam gimbal contacting the indented surface on the back-side of the slider, creating a slider roll center less than the slider thickness.

The invention also includes sliders with a slider contact cover interfacing to the load beam to form the gimbal. The slider contact cover approximates a hemisphere with a center. The center creates a slider roll center less than the slider thickness.

The slider contact covers may couple with the slider through an indented surface located closer than the slider thickness to the front-side of the slider. Such embodiments may have a negative slider roll center, which preferably minimizes the total TMR displacement of the head gimbal assembly in the presence of disk vibration. In certain further preferred embodiments, the negative slider roll center may effectively eliminate the total TMR displacement in the presence of disk vibration.

The invention includes the actuator arms, the actuator assemblies, and the hard disk drives containing these head gimbal assemblies.

The invention includes the making of the invention's sliders, as well as making the head gimbal assemblies. The invention also includes making the actuator arms, the actuator assemblies, and the hard disk drives using these head gimbal assemblies. The invention includes the products of the processes of making the sliders, the head gimbal assemblies, the actuator arms, the actuator assemblies, and the hard disk drives.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 3A is a cross section view through a typical prior art disk operating when the disk surface bends down;

FIG. 3B is a radial-directional view through the prior art disk of FIG. 3A, when the disk surface bends down;

FIG. 3C is a cross section view through the prior art disk of FIG. 3A operating when the disk surface bends up;

FIG. 3D is a radial-directional view through the prior art disk of FIG. 3A operating when the disk surface bends up;

FIG. 22A shows a head gimbal assembly using a load beam with a slip cover interfacing with the slider contact cover on the flat back-side of a slider to lower the effective roll center position below the overall slider thickness;

FIG. 22B shows the head gimbal assembly of FIG. 22A with the dimpled covering seated on an indented surface of the back-side of the slider to lower the effective roll center position below the overall slider thickness;

FIG. 22C shows a perspective view of the slider back-side of FIG. 22B;

FIG. 24A shows a top view of an assembled head gimbal assembly, excluding the slider; and FIG. 24B shows an exploded view of the components of a head gimbal assembly, excluding the slider.

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

Disclosed are improved head gimbal assemblies addressing TMR. They support parallel flying sliders over flat disk surfaces, and reduce TMR induced by disk vibration.

Figure 1:
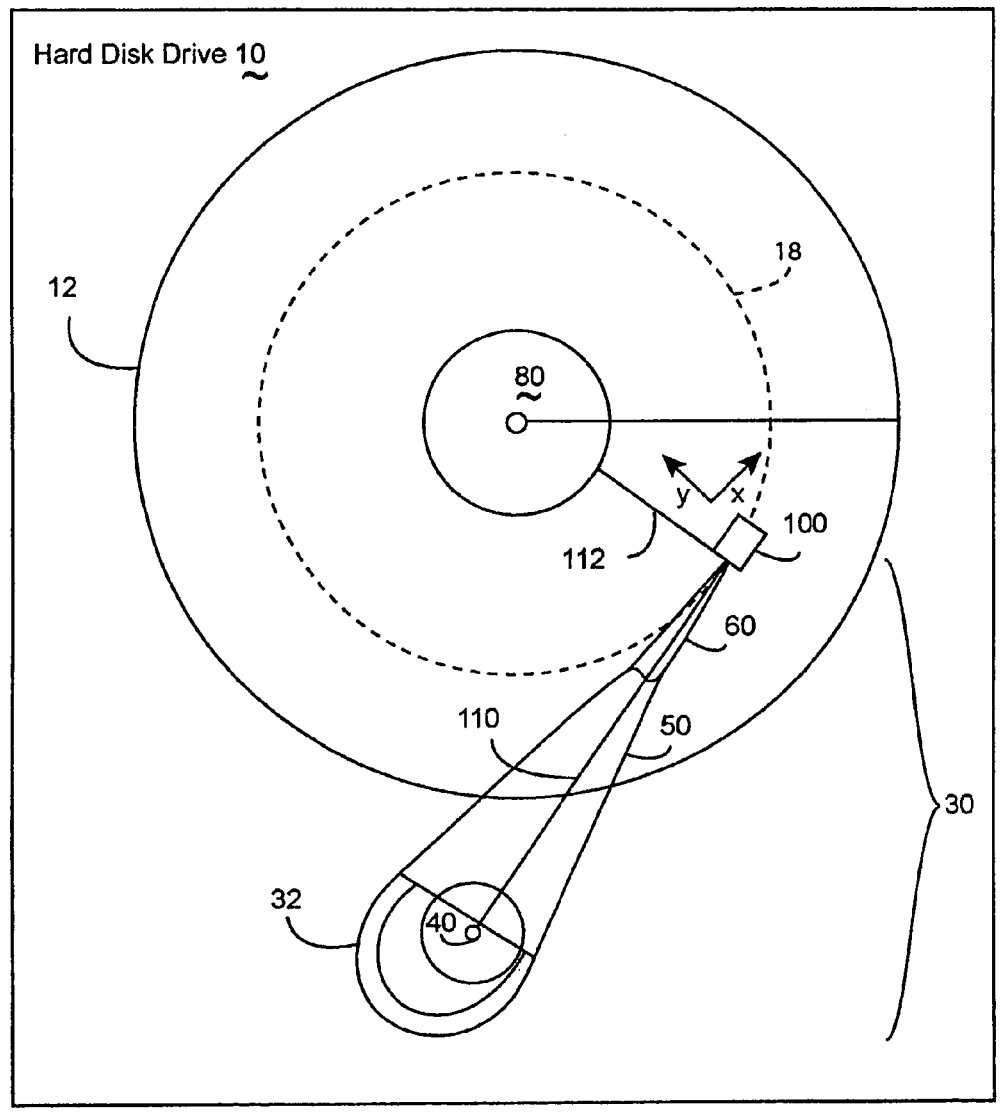
FIG. 1 is a simplified schematic of the relationship between the principal axis of the actuator arm, the head gimbal assembly, the slider, and the radial vector from the center of the spindle hub.

Referring to the drawings, more particularly by reference numbers, FIG. 1 shows an example actuator arm assembly 30 pivoting about the actuator axis 40, changing the angle between the radial vector 112 and the actuator principal axis 110. The actuator arm assembly 30 includes the actuator arm 50 coupled to head gimbal assembly 60, which is coupled to slider 100.

In FIG. 1, the X axis extends along the principal axis 110 of the actuator arm. The Y axis intersects the X axis at essentially the radial vector 112. A representative track 18 is shown on the disk surface 12. One skilled in the art will recognize that tracks extend over most of the disk surface.

The hard disk drive 10 may include a plurality of actuator arms and head sliders located adjacent to the disks, which are mechanically controlled by the same voice coil motor through the coupled voice coil 32 of FIG. 1. The read-write heads typically have separate write and read elements. The read-write heads magnetize and sense the magnetic field of the disks when accessing the tracks on the disk surface.

Figure 2:
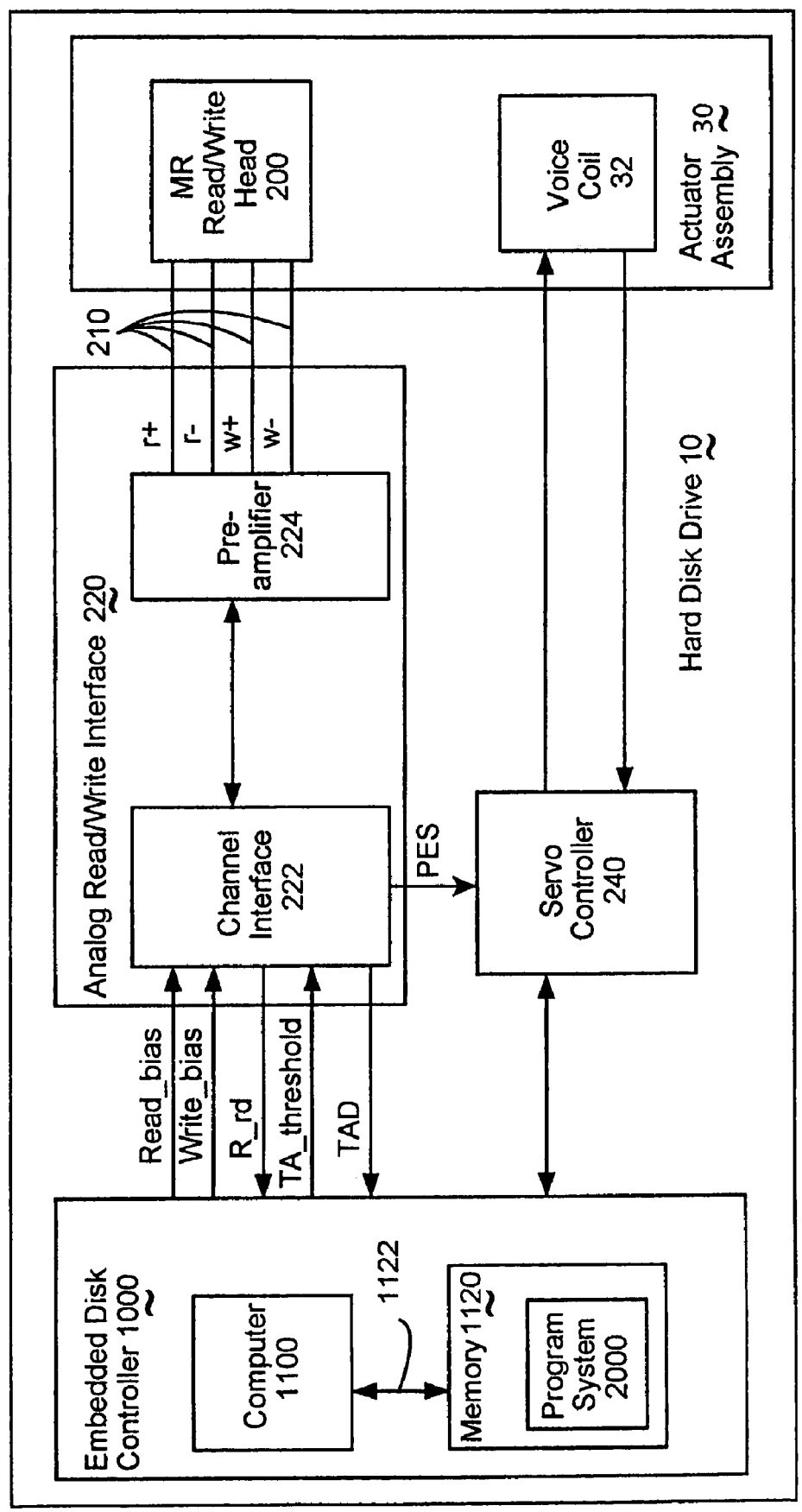
FIG. 2 is a simplified schematic of a disk drive controller controlling a hard disk drive.

FIG. 2 shows schematic of an example disk drive controller 1000, which includes a voice coil 32 couple to a magnet assembly to create a voice coil motor. Providing a current to the voice coil 32 creates a torque that swings the actuator arm 50, contained in the actuator assembly 30. Moving the actuator arm 50 moves the actuator arm assembly 30, which moves the read-write heads 200 across the surfaces 12 of the disks as in FIG. 1.

The hard disk drive 10 may further include a disk drive controller 1000. In FIG. 2, disk drive controller 1000 communicates with the analog read-write interface 220, which in turn communicates the resistivity found in the spin valve within read-write head to controller 1000.

The analog read-write interface 220 frequently includes a channel interface 222 communicating with pre-amplifier 224. The channel interface 222 receives commands from the embedded disk controller 1000, setting the read_bias and write_bias. The hard disk drive analog read-write interfaces 220 may employ either a read current bias or a read voltage bias. For example, the resistance of the read head is determined by measuring the voltage drop (V_rd) across the read differential signal pair (r+ and r−), based upon the read bias current setting read_bias, using Ohm's Law.

In FIG. 2, the channel interface 222 provides the Position Error Signal (PES) to the servo controller 240. The servo controller 240 controls the voice coil 32 to keep the read-write head 200 close enough to a track (such as track 18 of FIG. 1) to support the read-write head 200 accessing the track 18.

FIGS. 3A to 3D show off-track motion induced by the bending motion of a prior art, hard disk drive due to its axial vibration. FIGS. 3A and 3B show cross section and radial-directional views through the disk 14 when the disk surface 12 bends down 12-A. FIGS. 3C and 3D show cross section and radial-directional views through the disk 14 when the disk surface 12 bends up 12-B.

In FIGS. 3A to 3D, the read-write head position when the disk surface is flat is denoted A0, and when bent is denoted A1. The track position when the disk surface is flat is denoted B0, and when bent, is denoted B1. The amount of this off-track motion δ is composed of a head displacement δ$_1$ and a track displacement δ$_2$. δ$_1$ refers to the distance between A0 and A1. δ$_2$ refers to the distance between B0 and B1. The head displacement δ$_1$ is a function of the roll center position of head, t$_R$, and a disk bending angle θ determined by the disk dynamic properties (thickness, dynamic mode shape, disk axial vibration, radius from spindle center). The track displacement δ$_2$ is a function of the disk thickness t$_d$ and the disk bending angle θ.

This head-disk surface interface allows the use of the formula δ=δ$_1$+δ$_2$, for the motion of FIGS. 3A and 3C, given that difference A0−B0 is essentially 0, because $$Abs(A1 - B1) = Abs(A1 - A0 + A0 - B1 + B0 - B0)$$

$$= Abs((A1 - A0) + (B0 - B1) + (A0 - B0))$$

$$\approx Abs((A1 - A0) + (B0 - B1))$$

$$\delta \approx \delta_1 + \delta_2.$$

In FIGS. 3A and 3C, δ$_1$=t$_R$*θ, and δ$_2$=t$_d$/2*θ, making δ=(t$_d$/2+t$_R$)*θ. In contemporary disk drives, t$_d$ is about 1.26 mm, and t$_R$ is about 0.3 mm. This makes the slider induced contribution δ$_1$ to TMR about 32% of the total displacement δ. The disk thickness contributes δ$_2$ which is about 68% of the total displacement δ.

Figure 4:
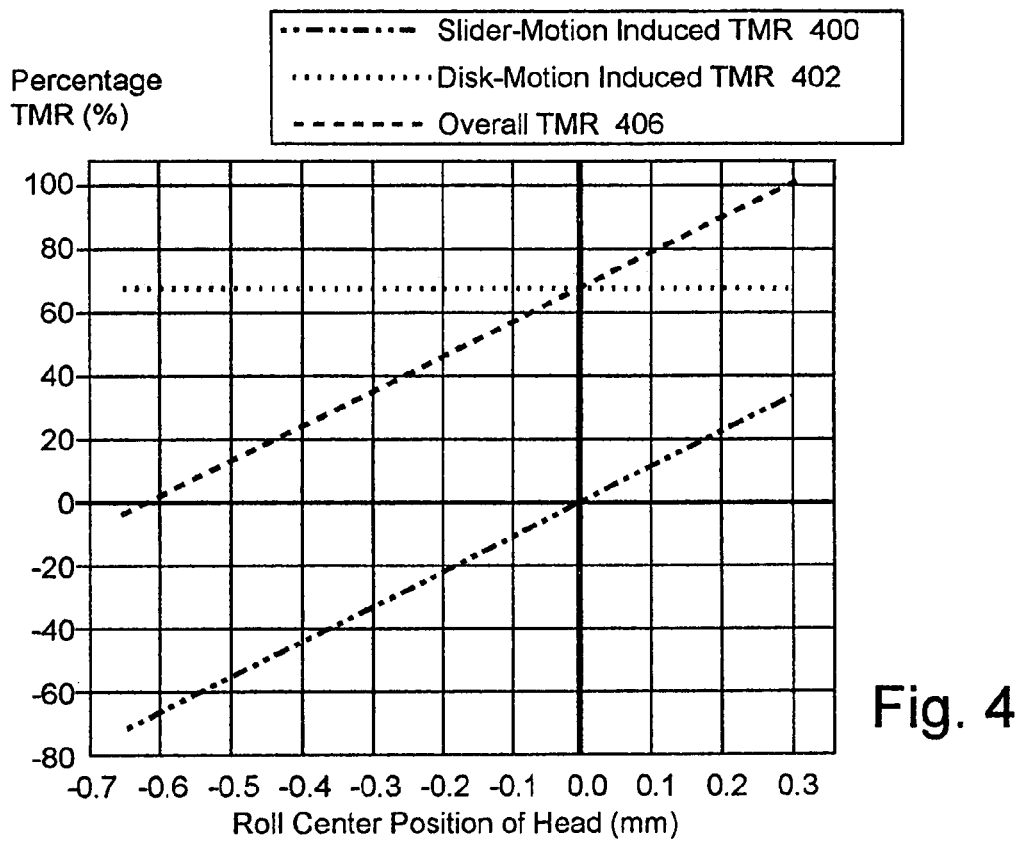
FIG. 4 shows the relationship of the overall TMR, to the disk motion induced TMR and the slider induced TMR.

FIG. 4 shows a graph of the relationship between the overall TMR 406, to the disk motion induced TMR 402 and the slider induced TMR 400. As the roll center position t$_R$ is reduced, the slider induced TMR 400 and the overall TMR are reduced. The Figure shows that negative roll center positions are useful, potentially reducing the overall TMR.

FIG. 4 further shows that if the roll center position of the head is negative and a half of the disk thickness in magnitude, the TMR displacement can be eliminated. The invention includes embodiments of sliders, which possess negative roll centers, as will be shown later.

Figure 5:
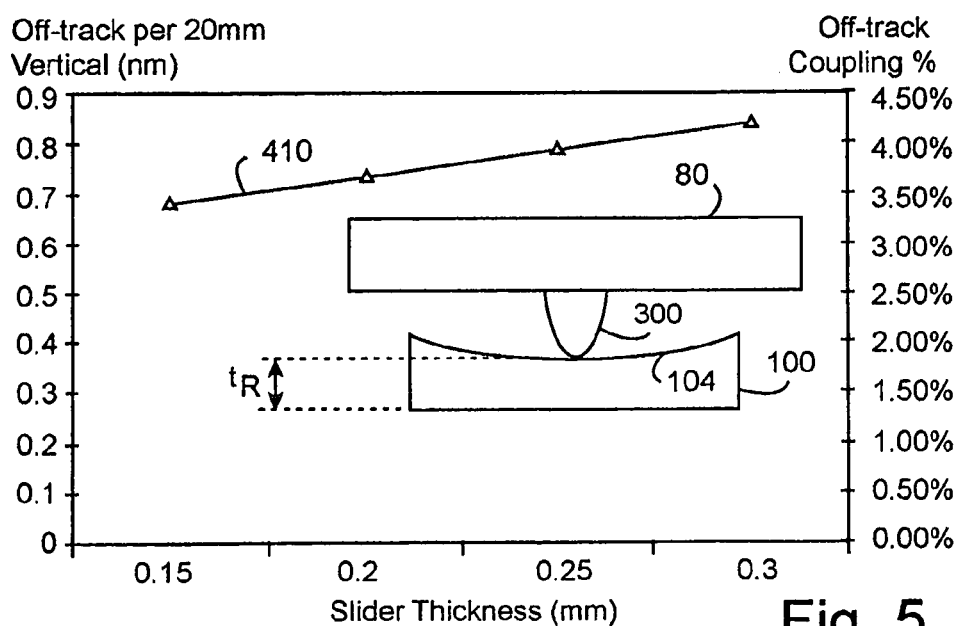
FIG. 5 shows the relationship between the effective slider thickness for a concave slider with a tall dimple on a load beam.

FIG. 5 shows the relationship between the effective slider thickness t$_R$ for a concave slider 100 with a tall dimple 300 on load beam 80. The left vertical axis is the off-track displacement δ measured in nano-meters (nm), per 20 nm vertical height of the tall dimple 300. The right vertical axis shows the off-track coupling between the tall dimple 300 and the effective slider thickness t$_R$. Trace 410 summarizes the simulation results shown in Table One:

| Effective Slider Thickness t$_R$ | Off-Track displacement δ in nm | Off-track coupling | Reduction from baseline |
|---|---|---|---|
| 0.15 mm | 0.68509211 | 3.43% | 18.5% reduction |
| 0.20 mm | 0.737019533 | 3.69% | 12.24% reduction |
| 0.25 mm | 0.788947173 | 3.94% | 6.2% reduction |
| 0.30 mm | 0.840876331 | 4.20% | Baseline |

Table One shows the relationships plotted in trace 410 of FIG. 5, between the effective slider thickness t$_R$ and the off-track displacement δ, the off track coupling and its reduction from the baseline.

In FIGS. 4, and 6 to 13, load beam 80 includes gimbal 300 contacting slider 100. In FIGS. 4, and 8 to 17, gimbal 300 contacts slider 100 on an indented surface 104.

Figure 6:
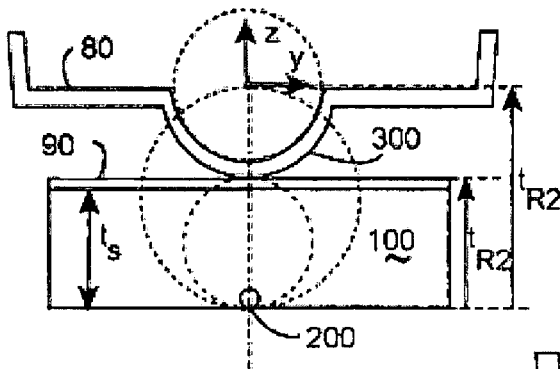
FIG. 6 shows a prior art head gimbal assembly in cross section about the gimbal, with a roll center position of the read-write head for ideal rolling conditions.
Figure 7:
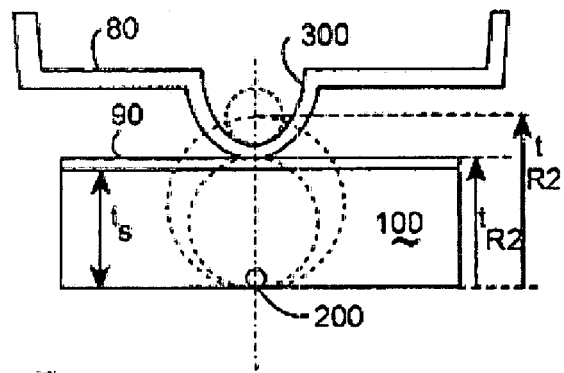
FIG. 7 shows a prior art head gimbal assembly in cross section about the gimbal, with a roll center position of the read-write head for ideal slipping conditions.

FIG. 6 shows a prior art head gimbal assembly in cross section about the gimbal 300, with a roll center position t$_{R1}$ of the read-write head 200 for ideal rolling conditions. FIG. 7 shows a prior art head gimbal assembly in cross section about the gimbal 300, with a roll center position t$_{R2}$ of the read-write head 200 for ideal slipping conditions.

FIGS. 4, and 8 to 17, show the head gimbal assembly in cross section using an indented surface 104 on the back-side of the slider 100 to lower the effective roll center position t$_R$ below the slider thickness t$_S$.

Figure 16:
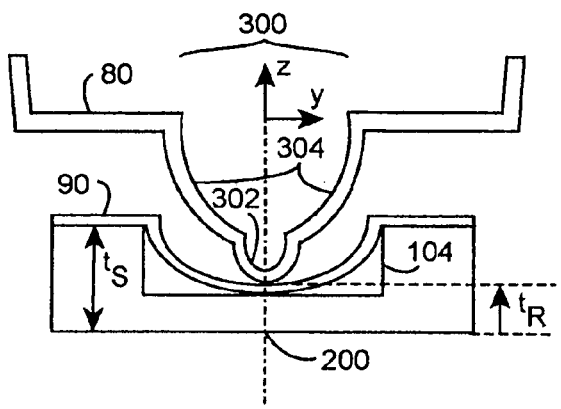
FIG. 16 shows a head gimbal assembly in cross section using a dented gimbal on the load beam interfacing with a covered, rectangular indented back-side of the slider to lower the effective roll center position below the overall slider thickness.
Figure 17:
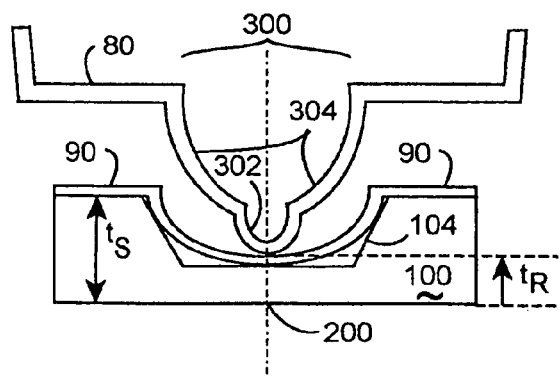
FIG. 17 shows a head gimbal assembly in cross section using a dented gimbal on the load beam interfacing with a covered, polyhedral indented back-side of the slider to lower the effective roll center position below the overall slider thickness.

FIGS. 8, 10, 12, 14, 16 and 17, show the head gimbal assembly in cross section further using a slider contact cover 102 on the indented surface 104. FIGS. 16 and 17 show the slider contact cover 102 as included in flexure 90. FIGS. 8, 10, 12, and 14, show the slider contact cover 102 distinct from the flexure 90.

FIGS. 10 to 17 show head gimbal assemblies using a gimbal 300 on the load beam 80, which includes a contact surface 302 merged with a roll surface 300 to the load beam 80. The roll surface 304 is wider than the contact surface 302 in the plane of the load beam 80.

Figure 10:
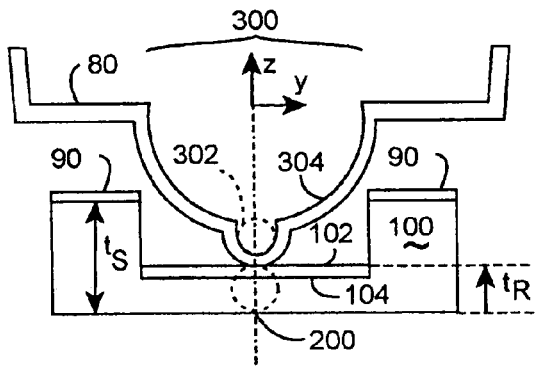
FIG. 10 shows a head gimbal assembly in cross section using a dented gimbal on the load beam interfacing with a covered, indented back-side of the slider to lower the effective roll center position below the overall slider thickness.
Figure 11:
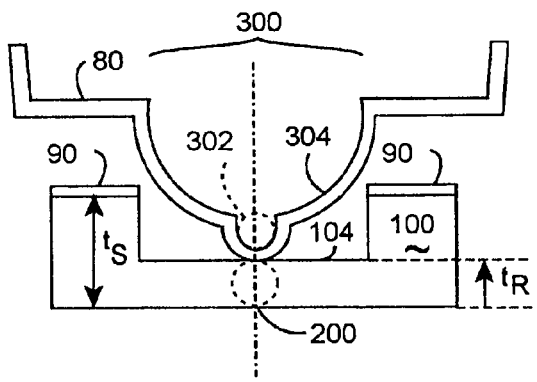
FIG. 11 shows a head gimbal assembly in cross section using a dented gimbal on the load beam interfacing with an indented back-side of the slider to lower the effective roll center position below the overall slider thickness.
Figure 12:
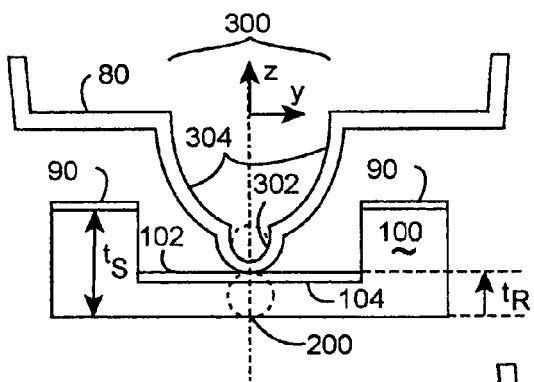
FIG. 12 shows a head gimbal assembly in cross section using a narrow, dented gimbal on the load beam interfacing with a covered, indented back-side of the slider to lower the effective roll center position below the overall slider thickness.
Figure 13:
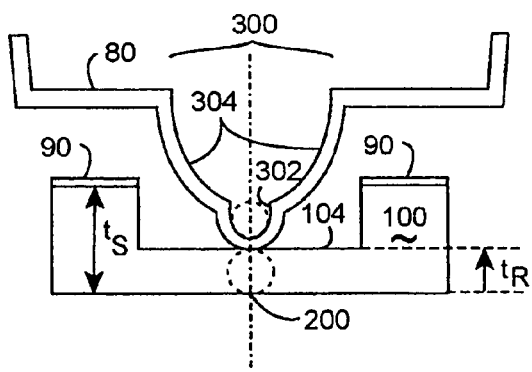
FIG. 13 shows a head gimbal assembly in cross section using a narrow, dented gimbal on the load beam interfacing with an indented back-side of the slider to lower the effective roll center position below the overall slider thickness.

FIGS. 10 and 11 show the head gimbal assembly in cross section using a wider gimbal 300 than the head gimbal 300 in FIGS. 12 and 13.

Figure 14:
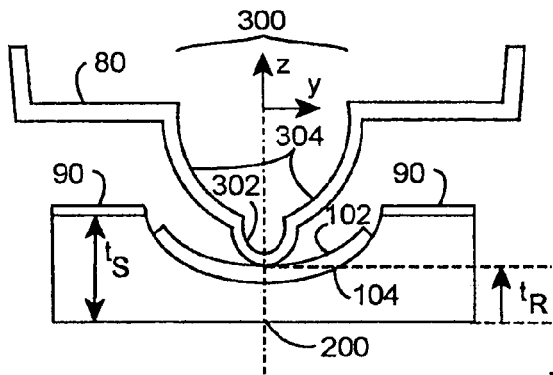
FIG. 14 shows a head gimbal assembly in cross section using a dented gimbal on the load beam interfacing with a covered, concave back-side of the slider to lower the effective roll center position below the overall slider thickness.
Figure 15:
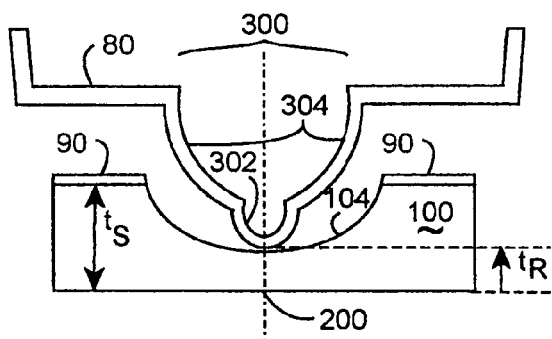
FIG. 15 shows a head gimbal assembly in cross section using a dented gimbal on the load beam interfacing with a concave back-side of the slider to lower the effective roll center position below the overall slider thickness.

FIGS. 14 and 15 show the indented surface 102 as a concave surface. FIGS. 4, 8 to 13, 16, and 17, show the indented surface 104 as essentially a polygonal surface rotated about an ideal contact line between the load beam gimbal 300 and the indented surface 102. The ideal contact line is approximately the z axis as shown in these Figures. In FIGS. 4, 8 to 13, and 16, the polygonal surface is further essentially, a rectangular surface.

FIGS. 18 to 23B show a head gimbal assembly in cross section using a load beam 80 contacting a slider 100 on a slider contact cover 120 approximating a hemisphere with a center 150. The center 150 creates the slider roll center $t_R$, which is less than the slider thickness $t_S$.

Figure 18:
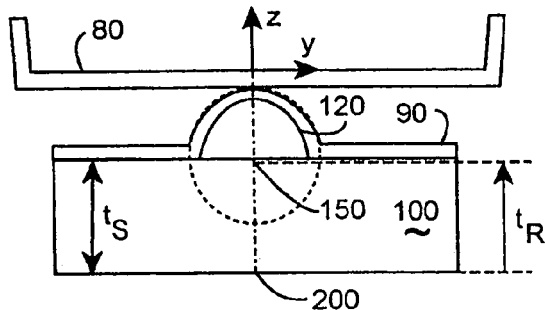
FIG. 18 shows a head gimbal assembly in cross section using a load beam interfacing with a dimpled flexure covering a flat back-side of the slider to lower the effective roll center position below the overall slider thickness.
Figure 19:
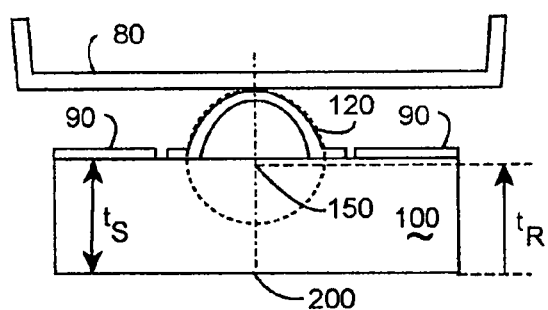
FIG. 19 shows a head gimbal assembly in cross section using the load beam interfacing with a dimpled slider cover of the slider to lower the effective roll center position below the overall slider thickness.
Figure 20:
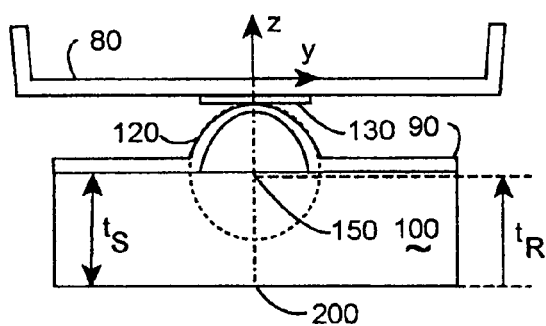
FIG. 20 shows a head gimbal assembly using a load beam with a slip cover interfacing with the dimpled flexure covering a flat back-side of the slider to lower the effective roll center position below the overall slider thickness.
Figure 21:
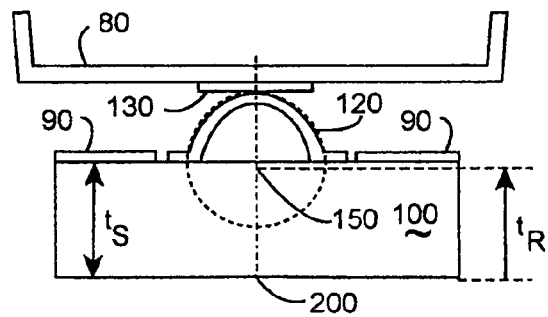
FIG. 21 shows a head gimbal assembly using the load beam with a slip cover interfacing with the slider cover of the slider to lower the effective roll center position below the overall slider thickness.

FIGS. 18 and 20 show the slider contact cover 120 included in the flexure 90. FIGS. 19, and 21 to 23B show the slider contact cover 120 separate from the flexure 90.

FIGS. 22B to 23B show the slider contact cover 120 on an indented surface 104. The slider contact cover 120 on the indented surface 104 is located less than the slider thickness $t_S$ from the front-side of the slider 100 containing the read-write head 200. This decreases the roll center $t_R$.

FIGS. 19 to 22B, 23A and 23B show the load beam 80 with a slip cover 130 interfacing the load beam contact with the slider contact 120. The slip cover 130 is preferably comprised of a material with a low coefficient of friction, and preferably further provides a dampening effect to vertical vibrations.

Figure 23A:
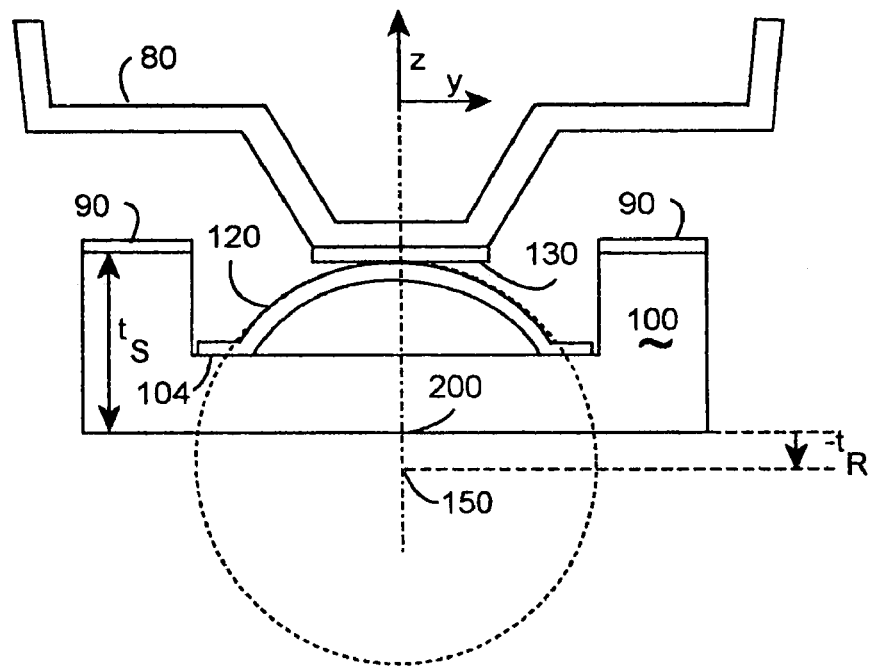
FIG. 23A shows a head gimbal assembly with a dented contact zone of the load beam coupling with a slider contact cover as in FIG. 22B, providing a negative slider roll center.
Figure 23B:
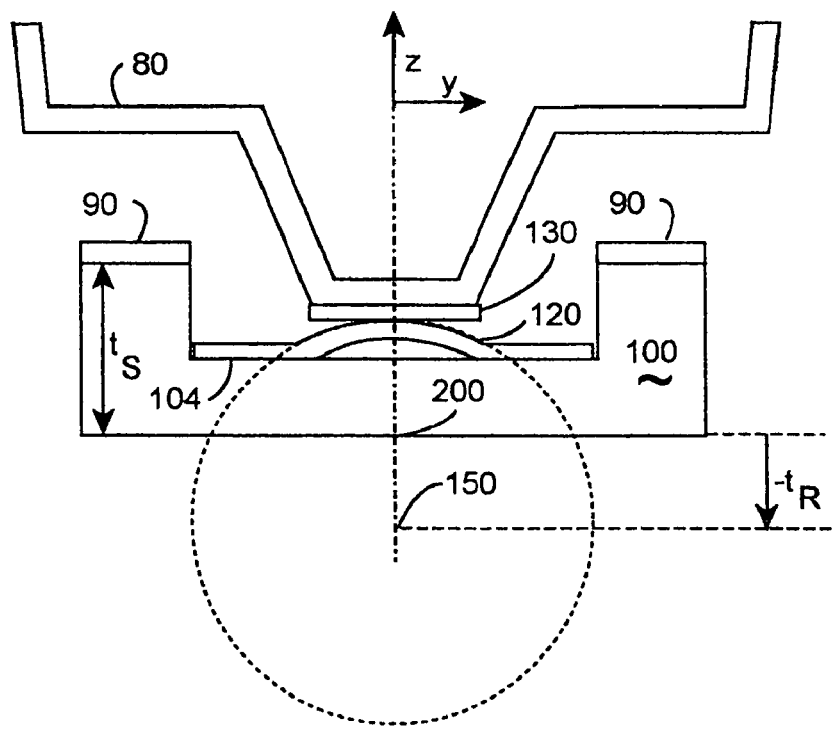
FIG. 23B shows an alternative head gimbal assembly of FIG. 23A, also providing a negative slider roll center.

FIGS. 22B, 23A and 23B show the load beam 80 further comprising a dented contact zone toward the slider 100, which includes the slip cover 130.

FIGS. 24A and 24B show a top view and an exploded view of an assembled head gimbal assembly 60, excluding the slider. The head gimbal assembly 60 is shown including a load beam 80, flexure 90, hinge plate 82 and base plate 84. Traces 210 of FIGS. 2 and 24B interconnect the read-write head 200 through the preamplifier 224 in the analog read-write interface 220. These traces 210 provide the means for controlling and sensing the read-write head 200 in its access of a track 18, as shown in FIGS. 1, and 3A to 3D.

Figure 8:
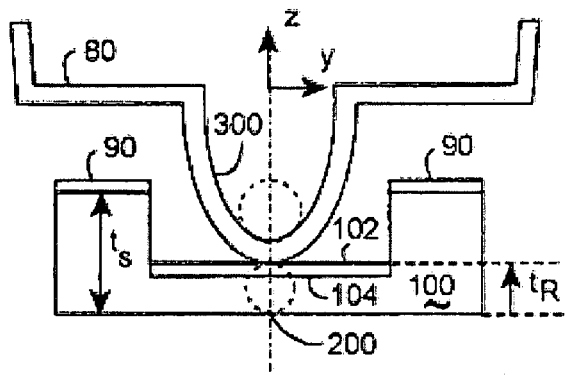
FIG. 8 shows a head gimbal assembly in cross section using a covered, indented back-side of the slider to lower the effective roll center position below the overall slider thickness.
Figure 9:
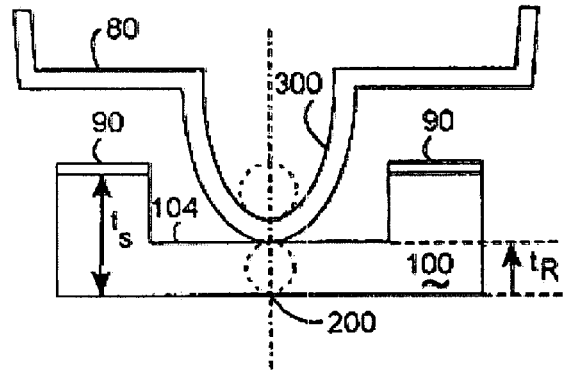
FIG. 9 shows a head gimbal assembly in cross section using an indented back-side of the slider to lower the effective roll center position below the overall slider thickness.

The invention includes the slider 100 with an indented surface 104 as shown in FIGS. 5, 8 to 17, and 22B to 23B. The slider 10 may further preferably include a slider contact cover 120 on the indented surface 104 as shown in FIGS. 22B to 23B. Alternatively, the slider 100 may include a flat slider contact cover 102 as shown in FIGS. 8, 10, and 12.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A head gimbal assembly to access a rotating disk surface in a hard disk drive, comprising:
   a load beam gimbal contacting an indented surface on a back-side of a slider to create a roll center of said slider less than a thickness of said slider, said slider including said back-side, a front-side, and a read-write head embedded between said back-side and a front-side, with said front side essentially parallel said back-side except in said indented surface.

2. The apparatus of claim 1, wherein said load beam gimbal comprises a contact surface merged with a roll surface to a load beam containing said load beam gimbal; wherein said roll surface is wider than said contact surface in the plane of said load beam; wherein said load beam gimbal contacting said indented surface further comprises said contact surface contacting said indented surface.

3. The apparatus of claim 1, wherein said indented surface is essentially a smooth concave surface closer than said slider thickness to a front-side of said slider containing said read-write head.

4. The apparatus of claim 1, wherein said indented surface is essentially a polygonal surface rotated about an ideal contact line between said load beam gimbal and said indented surface.

5. The apparatus of claim 4, wherein said polygonal surface is essentially a rectangular surface.

6. The apparatus of claim 1, wherein said load beam gimbal contacting said indented surface further comprises said load beam gimbal contacting said indented surface via a slider contact cover.

7. The apparatus of claim 6, further comprising a flexure electrically coupled to a read-write head in said slider, and said flexure provides said slider contact cover.

8. An actuator arm, including: at least one head gimbal assembly of claim 1.

9. An actuator assembly, including: at least one actuator arm of claim 8.

10. A hard disk drive, including: said actuator assembly of claim 9.

11. A method of making a head gimbal assembly supporting a read-write head in said head gimbal assembly accessing a rotating disk surface in a hard disk drive comprising the steps of:
   providing a load beam with a load beam gimbal;
   providing a slider with an indented surface on a back-side of said slider, said slider including said back-side, a front-side, and a read-write head embedded between said back-side and a front-side, with said front side essentially parallel said back-side except in said indented surface; and
   placing said load beam gimbal in contact with said indented surface on said back-side of said slider to create a roll center of said slider less than a thickness of said slider.

12. The method of claim 11, wherein said load beam comprises a contact surface merged with a roll surface to said load beam;
   wherein said roll surface is wider than said contact surface in the plane of said load beam;
   wherein said load beam gimbal contacting said indented surface further comprises said contact surface contacting said indented surface.

13. The method of claim 11, wherein said indented surface is essentially a smooth concave surface closer than said slider thickness to a front-side of said slider containing said read-write head.

14. The method of claim 11, wherein said indented surface is essentially a polygonal surface rotated about an ideal contact line between said load beam gimbal and said indented surface.

15. The method of claim 14, wherein said polygonal surface is essentially a rectangular surface.

16. The method of claim 11, wherein said load beam gimbal contacting said indented surface further comprises said load beam gimbal contacting said indented surface via a slider contact cover.

17. The method of claim 16, further comprising the step of: providing a flexure electrically coupled to a read-write head in said slider; wherein said flexure includes said slider contact cover.

18. Said head gimbal assembly as a product of the process of claim 11.

19. A method of making an actuator arm, comprising the step of: providing at least one head gimbal assembly of claim 11 to create said actuator arm.

20. Said actuator as a product of the process of claim 19.

21. A method of making an actuator assembly, comprising the step of: providing at least one actuator arm of claim 19 to create said actuator assembly.

22. Said actuator assembly as a product of the process of claim 21.

23. A method of making a hard disk drive, comprising the step of: providing said actuator assembly of claim 21 to create said hard disk drive.

24. Said hard disk drive as a product of the process of claim 23.

* * * * *